(12) United States Patent
Davies et al.

(10) Patent No.: US 9,045,254 B2
(45) Date of Patent: Jun. 2, 2015

(54) CARGO PALLET COVER WITH DRAINAGE

(71) Applicant: AMSAFE Bridport Limited, Bridport (GB)

(72) Inventors: Andrew Alexander Davies, Bucknell (GB); Ahamed Shakir Jamaldeen, Battaramulla (LK); Ranasinghe Hewage Prasad Kularatna, Kandy (LK); Gamaralalage Manoj Buddhika, Pallewela (LK)

(73) Assignee: AMSAFE Bridport Limited, Bridport, Dorset (GB)

( * ) Notice: Subject to any disclaimer, the term of this patent is extended or adjusted under 35 U.S.C. 154(b) by 85 days.

(21) Appl. No.: 13/769,286

(22) Filed: Feb. 16, 2013

(65) Prior Publication Data

US 2014/0230976 A1  Aug. 21, 2014

(51) Int. Cl.
*B60P 7/08* (2006.01)
*B65D 19/38* (2006.01)

(52) U.S. Cl.
CPC ............... *B65D 19/38* (2013.01); *B60P 7/0876* (2013.01)

(58) Field of Classification Search
CPC ............ B60P 7/08; B60P 7/02; B60P 7/0876; B65D 19/38
USPC .................. 150/154, 167; 206/597; 383/103; 410/97
See application file for complete search history.

(56) References Cited

U.S. PATENT DOCUMENTS

| | | | | |
|---|---|---|---|---|
| 2,556,418 A | * | 6/1951 | Del Mar | 62/62 |
| 3,066,847 A | * | 12/1962 | Fortune | 206/524.1 |
| 3,547,340 A | * | 12/1970 | McDonald | 383/111 |
| 3,968,913 A | * | 7/1976 | Weed et al. | 224/488 |
| 4,134,535 A | * | 1/1979 | Barthels et al. | 383/102 |
| 5,429,236 A | * | 7/1995 | Evans | 206/386 |
| 5,921,389 A | * | 7/1999 | Zoffer | 206/335 |
| 6,070,432 A | * | 6/2000 | Lavin | 62/640 |
| 6,101,955 A | * | 8/2000 | Salce | 108/51.11 |
| 6,540,085 B1 | * | 4/2003 | Davies | 206/597 |
| 7,766,590 B2 | * | 8/2010 | Mapitigama et al. | 410/97 |
| 7,947,354 B2 | * | 5/2011 | Pirogovsky et al. | 428/76 |
| 2009/0020448 A1 | * | 1/2009 | Emond et al. | 206/423 |
| 2009/0288980 A1 | * | 11/2009 | Hadala | 206/597 |
| 2011/0258972 A1 | * | 10/2011 | Kenneally | 53/468 |

FOREIGN PATENT DOCUMENTS

| | | |
|---|---|---|
| GB | 2338472 A | 12/1999 |
| GB | 2 439 450 | 12/2007 |
| WO | 02062619 A1 | 8/2002 |

OTHER PUBLICATIONS

Search report for corresponding GB application No. GB1202592.0 received Jun. 18, 2012.

* cited by examiner

*Primary Examiner* — Sue A Weaver
(74) *Attorney, Agent, or Firm* — Strategy IP, a professional law corporation

(57) ABSTRACT

A cargo pallet cover (14) having a main panel (15) and a plurality of side panels (16) extending therefrom, the main panel (15) being adapted to overlie a load (10) on a pallet (12) in use and the side panels (16) being adapted to hang down against the sides of the load (10), each side panel (16) being attached to an adjacent side panel (16) along adjacent edges to define a corner, the cargo pallet cover (14) comprising at least one drainage panel (22) to permit liquid to drain through the cargo pallet cover (14).

15 Claims, 2 Drawing Sheets

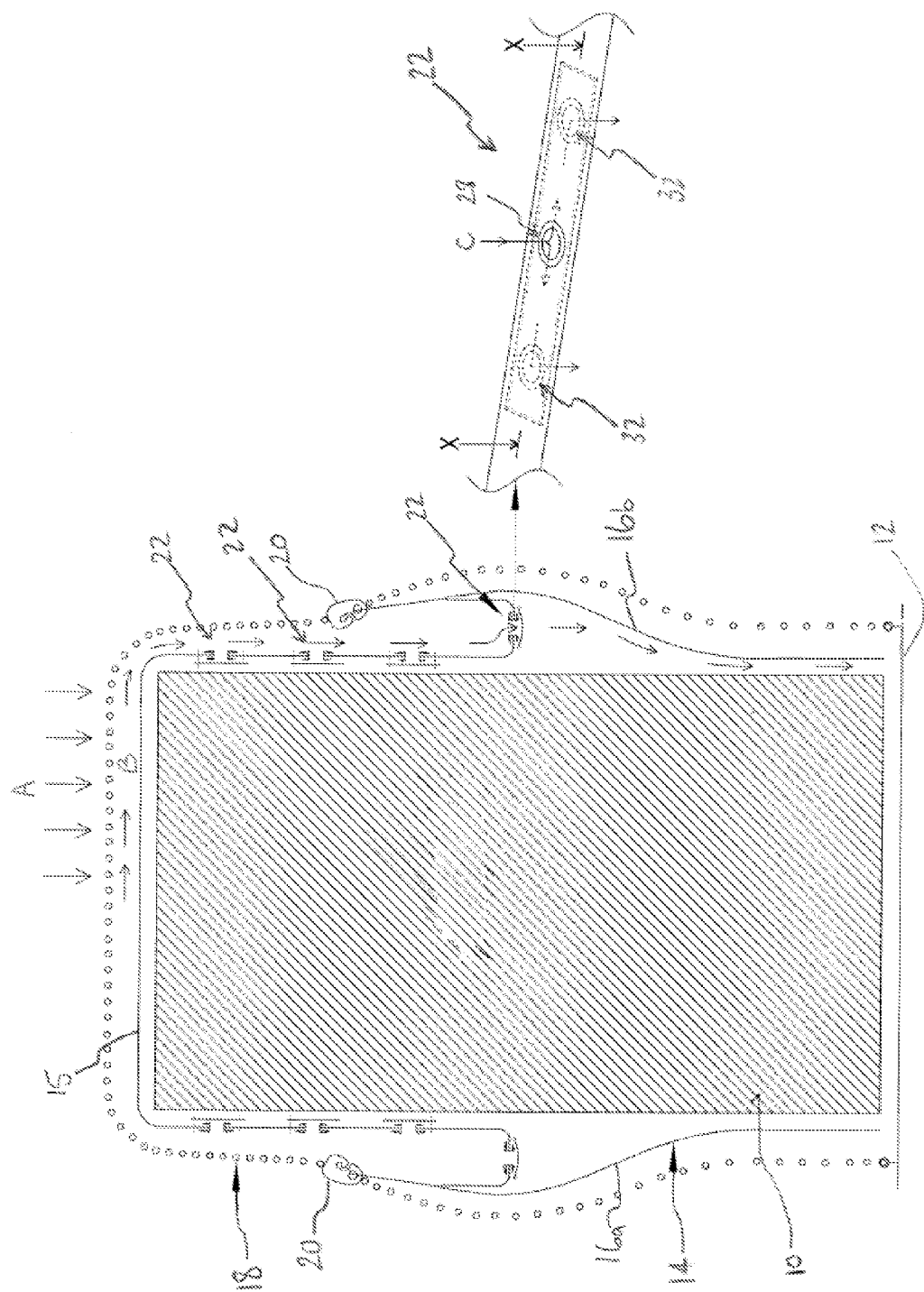

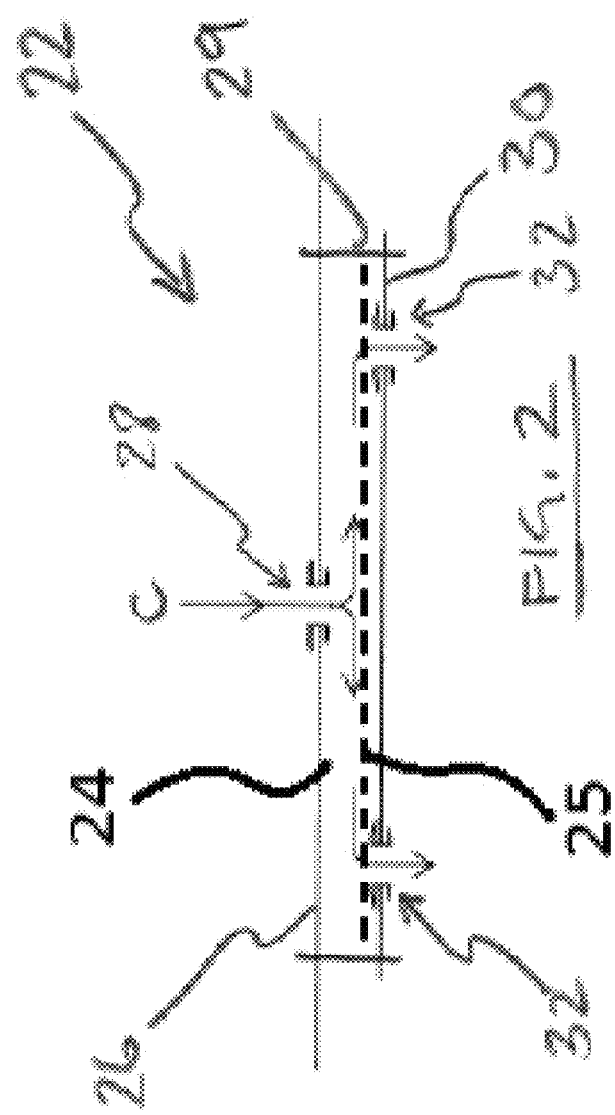

CARGO PALLET COVER WITH DRAINAGE

FIELD OF THE INVENTION

The present invention relates to a cargo pallet cover and to the combination of a cargo pallet cover and a pallet net.

BACKGROUND OF THE INVENTION

When goods are being transported by airfreight they are typically loaded onto pallets and secured in place using a suitable pallet net. Once the load is secured on a pallet it may be loaded into the cargo hold of an aircraft. One such net is disclosed in WO 02/062619 A1. The pallet net is of generally conventional cruciform construction and comprises a main panel which overlies the load in use and a plurality of wing panels which hang down against the sides of the load. The bottom edge of each wing panel is provided with a plurality of double stud fittings which can be secured to a complimentary seat track on the pallet. Each side edge of the wing panels meets with an adjacent side edge to define a net corner. The net corners are releasably secured using any suitable means. In the pallet net disclosed in WO 02/062619 A1 the net includes a plurality of corner securement devices which may be utilised to close the corner and secure the load onto the pallet net for transportation. In other known nets the corner may be secured by means of a lashing line which extends from the main panel between the side panels and may be threaded between adjacent side panels to secure the corner.

Cargo pallet covers are commonly used to cover a load built up on a pallet for transportation. The pallet cover serves to provide some form of additional protection to the load, typically to protect the load from the elements. The additional protection may take a wide variety of forms, for example it may serve to provide a waterproof barrier layer, a thermal insulation layer, an electrical insulation layer, impact protection, or any other properties which may be required for the specific load being transported. Alternatively, the pallet cover may take the form of fireproofing for the load to prevent a fire spreading from the load to other items stored in the cargo hold. A wide variety of pallet covers are known and the material properties will vary depending on the protection required for the specific load. Once the load has been built up on the pallet the pallet cover is placed on top of the load and the combination of load and cover is secured to the pallet by a pallet net in the manner described above.

Currently available pallet covers are known to function well, but a number of problems exist, most notably with their handling and use on irregular shaped loads. When the load is of a regular rectangular shape then the pallet cover will simply adapt to the shape of the load. However, it is quite common for the load to be of an irregular shape (typically one side will be higher than the other). Standard pallet nets are provided with reefing hooks which are used to take up any slack in the net material caused by irregular loads. When the load is of an irregular shape the pallet cover tends to bunch up and is also prone to hang below the bottom of the pallet. This can cause problems in securing the pallet net and can be time consuming to resolve for operators.

The problem is solved in GB 2 439 450 A by providing a pallet cover including a plurality of net attachment devices for attaching a pallet net to the pallet cover. By providing net attachment devices for attaching a cargo net to the pallet cover a user is presented with a simple integrated system which makes it easier and quicker to deploy the cargo pallet cover and pallet net. The time saved in fitting the cover and net represents significant savings in terms of time required to load goods on a pallet.

The net attachment devices are arranged such that they are associated with reefing hooks on the pallet net. The term "associated with reefing hooks" simply requires that the net attachment devices are located at a distance from the bottom edge of the side panel which is approximately the same distance as that of a reefing hook on the wing panel or the net to which it is attached. The actual location of the net attachment devices may be slightly above or slightly below the location of the reefing hooks. The net attachment devices will typically be provided in the lower half of the side panels, typically between a quarter and half way up the side panel in a direction measured away from the bottom edge.

Pallet nets are typically provided with reefing hooks at a set distance from the bottom edge of the wing panels. If a load is of a reduced height then the wing panel will not be taut when it is secured to the pallet. In order to remedy this the reefing hooks are engaged with a portion of the net mesh on the wing panel above the reefing hook in order to take up the slack.

The net attachment devices are associated with the reefing hooks on the pallet net and function to reef in the slack in the pallet cover. If the net attachment devices were not provided then the pallet cover would tend to bunch up when the load was of a reduced height. The excess material would gather at the base of the load and in addition to being unsightly it could interfere with the operation of the pallet net. When the reefing hooks on the pallet net are engaged with a portion of the net mesh the excess material is gathered into a fold in the pallet net. Exactly the same occurs with the pallet cover when the intermediate net attachment devices are attached to the wing panel of the pallet net in the region of the reefing hooks—the excess material is gathered in a fold and kept neatly out of the way. In this way, the lower portion of the pallet cover, between the intermediate net attachment devices and the bottom edge of the side panels, is maintained at a predetermined position regardless of the height of the load. The lower portion of the cover is supported by the pallet net so that it doesn't overhang the pallet.

The combination of a cargo pallet cover attached to a pallet net functions well to address the problem of bunching of the pallet cover material on reduced height loads. However, a problem with this construction is that the folds of excess material act as pockets, which been known to fill with water, for example when a load is left in the rain. This water can remain in the pocket during transportation of the load and can cause problems when it arrives at its end destination. For example, the water may be released when the load is broken down, causing a slip hazard for operators.

It is an object of the present invention to overcome some of the problems of the prior art, or at least to provide an alternative to the currently available equipment.

SUMMARY OF THE INVENTION

According to a first aspect of the present invention there is provided a cargo pallet cover having a main panel and a plurality of side panels extending therefrom, the main panel being adapted to overlie a load on a pallet in use and the side panels being adapted to hang down against the sides of the load, each side panel being attached to an adjacent side panel along adjacent edges to define a corner, the cargo pallet cover comprising a plurality of drainage panel to permit liquid to drain through the cargo pallet cover.

It has surprisingly been discovered that one of the problems of the prior art, i.e. the pooling of water in folds of the cargo cover, can be overcome by providing drainage panels which permit liquid, such as water, to drain through the cargo cover. This is counterintuitive, as it allows the water to come into contact with the load which the cargo cover is protecting. However, it has been discovered that this is not a major issue as it is common practice for cargo operators to shrink wrap (or otherwise cover) a load when it is built up, typically with a waterproof plastics material. In general at least a bottom portion of a load will be covered in this way, but it is common practice for operators to cover a whole load, as they often do not know if a cargo cover will be fitted to a load and they need to ensure it is protected from water damage. Consequently, it is possible to provide drainage panels to allow water to drain through the cargo pallet cover, without causing damage to the cargo.

In an embodiment of the invention each side panel is provided with at least one drainage panel. While it is possible to provide drainage panels on only some of the side panels, it is advantageous to provide all side panels with drainage panels, thus ensuring that water can drain away from all sides. In an embodiment of the invention a plurality of drainage panels are provided on each side panel. The drainage panels may conveniently be spaced along the length of the side panel, i.e. running in a direction from the main panel to the bottom edge of the side panel. This helps to ensure that a drainage panel will be located in a fold of the cargo pallet cover when the cargo pallet cover is reefed.

In an embodiment of the invention the drainage panels comprise a plurality of apertures for permitting the passage of liquid therethrough.

In an embodiment of the invention the drainage panels are configured to restrict the passage of liquid therethrough when the drainage panels are in a substantially vertical position. In an embodiment of the invention the drainage panels are configured to permit the passage of liquid therethrough when at least a portion of the drainage panels are in a substantially horizontal position.

An object of the invention is to prevent water from collecting in folds in the cargo pallet cover caused when the cargo pallet cover is reefed. Therefore it is desirable to permit water to flow through the drainage panel only when it is located at the bottom of a fold in the cargo pallet cover, created when the cargo pallet cover is reefed. This is achieved by providing a drainage panel which permits the passage of liquid therethrough when at least a portion of it is in a substantially horizontal position, as it will be when it is located at the bottom of a fold in the cargo pallet cover. While, as discussed above, the flow of water through the cargo pallet cover is permitted by a cargo pallet cover according to the present invention, is is still preferable to limit the flow as far as possible. For this reason, the drainage panels are configured to restrict the flow of liquid therethrough when they are in a substantially vertical position, as they will be when they are not located at the bottom of a fold in the cargo pallet cover, i.e. they are lying flat against the side of the load.

In an embodiment of the invention the cargo pallet cover is a single layer construction. In an embodiment of the invention the cargo pallet cover is a multi-layer construction.

In an embodiment of the invention the drainage panels are a multi-layer construction. In an embodiment of the invention the apertures in each of the layers are offset with respect to the adjacent layers. By offsetting the apertures in a multi-layer construction it is possible to achieve a construction whereby liquid may flow through only when at least a portion of the drainage panel is orientated in a substantially horizontal position.

In an embodiment of the invention the cargo pallet cover is fire resistant. In an embodiment of the invention the cargo pallet cover is a fire containment cover. In the event of a fire breaking out in the load, a fire containment cover is designed to prevent fire spreading to other items stored in the cargo hold. As discussed above, the present invention comprises drainage panels which permit water to drain through the cargo pallet cover. In an embodiment of the invention the drainage panels are configured such that they can permit water to flow through the cargo pallet cover, while still functioning to prevent the spread of fire. This may be achieved by a two-ply construction with offset drainage apertures, as described above, or other suitable constructions designed to permit the flow of water under certain circumstances, while preventing the spread of fire.

In an embodiment of the invention a wick is provided between each of the layers in adjacent layers of the multi-layer construction. The wick serves to aid the flow of liquid through the drainage panel by defining a path for the liquid.

In an embodiment of the invention the wick is fire resistant. In an embodiment of the invention the wick comprises a fire resistant textile material. In an embodiment of the invention the wick comprises fire resistant polyester.

According to a second aspect of the present invention there is provided a combination of a cargo pallet cover according to the first aspect of the present invention and a pallet net, wherein the pallet net is attached to the cargo pallet cover.

In an embodiment of the invention the pallet net comprises a plurality of reefing hooks.

In an embodiment of the invention the pallet net is attached to the cargo cover in the region of the reefing hooks.

BRIEF DESCRIPTION OF THE DRAWINGS

The present invention will now be described, purely by way of example, with reference to the accompanying drawings, in which:

FIG. 1a shows a sectional view of a combination of a cargo pallet cover and a pallet net covering a load;

FIG. 1b shows a top view of the drainage panel of the embodiment shown in FIG. 1a; and FIG. 2 shows a sectional view through X-X in FIG. 1b.

DETAILED DESCRIPTION OF THE DRAWINGS

FIGS. 1a and 1b show a schematic vertical section view of a load 10 built up on a pallet 12. The load 10 may comprise a single item or a plurality of items stacked together, as is well-known. The load 10 is shrink wrapped in a waterproof plastics material to provide a layer of environmental protection. It is standard practice to wrap palletised loads in shrink wrap, as cargo handling operators often do not know whether any additional protection will be provided. The shrink wrap also serves to keep the load together.

A combination of a cargo pallet cover 14 and a pallet net 18 cover the load 10. The combination may be of the type disclosed in GB 2 439 450 A, in which the pallet net 18 is attached to the cargo pallet cover 14, and the disclosure of GB 2 439 450 A is incorporated herein by reference. The pallet net 18 is of a generally standard form, such as disclosed in WO 02/062619 A1, the disclosure of which is incorporated herein by reference. The pallet net 18 comprises a plurality of reefing hooks 20 (only two shown), which can be used to "reef" the pallet net in order to take up any slack. The use of reefing hooks 20 in this manner is well-known. A plurality of securement fittings, such as double stud fittings (not shown), are provided along the bottom edge of the wing panels of the pallet net, for attaching the pallet net 18 to the pallet 12.

The cargo pallet cover 14 may be formed from any suitable material as is well-known in the art. The cargo pallet cover 14 is generally formed from a plastics material, selected to provide specific properties to the pallet cover 14, e.g. waterproofing, thermal properties, etc. The cargo pallet cover 14 may be a fire containment cover, formed from a fireproof material, and designed to prevent the spread of fire to other items stored in the cargo hold, in the event of a fire breaking out in the load 10. The cargo pallet cover 14 comprises a rectangular main panel 15, which covers a top surface of the load 10, and a four side panels (only two side panels 16a, 16b being shown in FIG. 1), which hang down against the sides of the load 10. Each side panel 16 is attached to an adjacent side panel 16 to define a bag-like structure which encompasses the load 10.

The pallet net 18 is attached to the cargo pallet cover 14 in the region of the reefing hooks 20, by any suitable means, such net attachment devices provided on the cargo pallet cover 14. The cargo pallet cover 14 and pallet net 18 may also be attached at other locations if required. The net attachment devices may comprise press stud fasteners provided on lengths of webbing material (not shown). The webbing material, bearing a portion of the press stud fastener, is passed around a section of the net mesh of the pallet net 18 and the press stud fastener is closed to secure the cargo pallet cover 14 to the pallet net 18. Other means of attachment are also envisaged within the scope of the present invention, as will be apparent to the skilled person. The term "in the region of" means that the net attachment devices are attached to the pallet net 18 at approximately the same location as the reefing hooks 20. The actual attachment may be slightly below the location of the reefing hooks 20 or it could be above the location of the reefing hooks 20. It is preferred that the net attachment devices are attached to the pallet net 18 slightly below the location of the reefing hooks 20, but it will be clear to the skilled person that the present invention will also function when the net attachment devices are attached to the pallet net 18 slightly above the location of the reefing hooks 20.

The cargo pallet cover 14 is provided with a plurality of drainage panels 22. Each side panel 16 is provided with a plurality of drainage panels 22 to permit the drainage of liquid on each side, as will be described in more detail below. The structure of the drainage panels 22 can best be seen in the detail section of FIG. 1 and in FIG. 2.

The drainage panel 22 is a two-layer construction comprising an outer layer 26, which may typically be the outer layer of the cargo pallet cover 14, and an inner layer 30, which may be formed from the same material as the outer layer 26 and stitched to the cargo pallet cover 14 using any suitable stitching pattern 29. The two-layer construction of the drainage panel can best be seen in FIG. 2. The outer layer 26 and inner layer 30 define a drainage channel 24 between the layers.

The outer layer 26 of the drainage panel 22 comprises an inlet aperture 28, through which liquid, such as rainwater, may enter the drainage channel 24. The inner layer 30 of the drainage panel 22 comprises two outlet apertures 32, through which liquid may exit the drainage channel 24. The inlet aperture 28 is offset from the outlet apertures 32, such that there is no direct path through the drainage panel 22. In order to pass through the drainage channel 24 liquid must enter through the inlet aperture 28, travel along a section of the drainage channel 24, and exit through one of the outlet apertures 32. This will be described in more detail below. It will be clear that the drainage panel 22 could have more than one inlet aperture 28, and more or less outlet apertures 32. The offset nature of the inlet aperture 28 and outlet apertures 32 means that liquid can only pass through the drainage panel 22 when at least a portion of the drainage panel 22 is in a substantially horizontal position. When the drainage panel 22 is in a substantially vertical position liquid will tend to flow over it, rather than through it. In the embodiment shown in FIG. 2, a wick 25 is provided between the adjacent layers of outer layer 26 and inner layer 30. Wick 25 comprises polyester, a fire resistant textile material.

An additional benefit of the two-layer construction is that it helps to maintain the integrity of the cargo pallet cover 14 in the situation where it is a fire containment cover. In such a situation it would be considered undesirable to have a drainage panel between the outside and the inside of the cargo pallet cover, as this could allow sparks or flames to spread from the load 10 to other items stored in the cargo hold. However, a two-layer construction with offset drainage apertures 28, 32, permits water to flow through in certain circumstances, while preventing fire from spreading outside of the cargo pallet cover 14.

In order to give a clearer understanding of the present invention its use under normal operation conditions will be described.

The first step is to build up the load 10 on the pallet 12. The load 10 is then shrink-wrapped in a plastics material to keep the individual items together, and to provide some environmental protection.

Next, the combined cargo pallet cover 14 and pallet net 18 are placed over the load 10 and arranged such that the main panel 15 covers a top surface of the load 10 and the four side panels 16 hang down against the sides of the load 10. The cargo pallet cover 14 and pallet net 18 are attached to one another to provide a single entity which may be placed over the load 10 in a one-step process. The pallet net 18 is provided with a plurality of reefing hooks 20, and the cargo pallet cover 14 is attached to the pallet net 18 in the region of the reefing hooks 20.

In some situations, as in that shown in FIG. 1, the load 10 will not be of a standard height, i.e. the height of the load 10 will be less than the maximum height of the cargo pallet cover 14 and pallet net 18. When the double stud fittings on the pallet net 18 are engaged with the pallet 12 there will be some excess material. This is not desirable as the cargo pallet cover 14 and pallet net 18 should ideally be taut to ensure that the load 10 is secure on the pallet 12. In conventional situations when no pallet cover is in use the excess material in the pallet net 18 is simply reefed in using the reefing hooks 20. The reefing hooks 20 are provided at a set distance from the bottom edge pallet net 18 and they can be engaged with a portion of the net mesh above them to take up any slack. When the cargo pallet cover 14 is attached to the pallet net 18 it is possible to take up the slack in the cargo pallet cover 14 as well.

If it is necessary to utilise the reefing hooks 20 in order to take up some slack in the pallet net 18 material then the pallet cover 14 will also be reefed in by virtue of the attachment of the net attachment devices. The excess material of the pallet cover 14 is gathered neatly into a fold 34 in the pallet cover 14. Accordingly, the bottom edge of the pallet cover 2 will always be level with the pallet 12, and will not hang over the edge. The distance from the net attachment devices to the bottom edge 11 of the pallet cover 2 will always be the same with no sagging of the pallet cover material. Any excess material will be gathered neatly in the fold 34.

The drainage panels 22 are evenly spaced along the length of each of the side panels 16, beginning near to the main panel 15 and ending at the point at which the cargo pallet cover 14 attaches to the pallet net 18 in the region of the reefing hooks 20. The spacing between adjacent drainage panels 22 is such that at least a portion of each drainage panel 22 will be located in a fold 34 of the cargo pallet cover 14 when the cargo pallet cover 14 is reefed. In use the majority of the drainage panels 22 will be orientated in a substantially vertical position. However, when the pallet net 18 and cargo pallet cover 14 have been reefed, the portion of the drainage panel 22 which is located in the fold 34 of the cargo pallet cover 14 will be orientated in a substantially horizontal position. This is important for the drainage of liquid, as will be described in more detail below.

Once the load 10 is secured on the pallet 12 by the combined cargo pallet cover 14 and pallet net 18 it is ready for transportation. However, there may be occasions when the load cannot be loaded straight away and it may be left outside prior to loading, for example it may be left on the tarmac at an airport prior to loading into the cargo hold of an aircraft. In such situation the load may be subjected to the elements, such as rain, snow, sleet, etc.

Rainfall is indicated by arrows A in FIG. 1. The cargo pallet cover 14 is made of a waterproof material, so when the rain hits the main panel 15 of the cargo pallet cover 14 it will tend to run off and down the side panels 16, as indicated by arrow B. When the pallet net 18 and cargo pallet cover 14 have been reefed to take up any slack the rainwater will run into the folds 34 defined by the excess material. As discussed above, rainwater will pass over the drainage panels 22 which are orientated in a substantially vertical position. However, the drainage panel 22 located in the fold 34 of the cargo pallet material 14 is orientated in a substantially horizontal position. As can be seen in FIG. 2, when the drainage panel 22 is in a substantially horizontal position rainwater is able to enter the inlet aperture 28, as indicated by arrow C, flow through the drainage channel 24, and exit through the outlet apertures 32. This results in rainwater coming into contact with the lower sections of the load 10, i.e. those parts which are located below the height of the reefing hooks 20 on a standard pallet net 18. This would normally be considered to be undesirable, but the present inventors have appreciated that it is not a major issue as the shrinking wrapping provides a waterproof barrier layer for the load. The rainwater is then able to flow onto the pallet 12 and drain in the normal manner. It is a surprising discovery that it is possible to permit water to drain to the inside of the cargo pallet cover 14, but it has been determined that this is preferable to allowing water to collect in the folds of a reefed cargo pallet cover 14.

The invention claimed is:

1. A cargo pallet cover having a main panel and a plurality of side panels extending therefrom, the main panel being adapted to overlie a load on a pallet in use and the side panels being adapted to hang down against the sides of the load, each side panel being attached to an adjacent side panel along adjacent edges to define a corner, the cargo pallet cover comprising at least one drainage panel to permit liquid to drain through the cargo pallet cover, wherein the at least one drainage panel is a multi-layer construction, and the at least one drainage panel comprises at least one aperture in each of at least two adjacent layers of the multi-layer construction for permitting the passage of liquid therethrough, the at least one aperture in each layer being offset with respect to the at least one aperture in the adjacent layer of the at least two adjacent layers.

2. A cargo pallet cover according to claim 1, wherein each side panel is provided with at least one drainage panel.

3. A cargo pallet cover according to claim 2, wherein a plurality of drainage panels are provided on each side panel.

4. A cargo pallet cover according claim 1, wherein the at least one drainage panel is configured to restrict the passage of liquid therethrough when the drainage panel is in a substantially vertical position.

5. A cargo pallet cover according to claim 1, wherein the at least one drainage panel is configured to permit the passage of liquid therethrough when at least a portion of the drainage panel is in a substantially horizontal position.

6. A cargo pallet cover according to claim 1, wherein the cargo pallet cover is a single layer construction.

7. A cargo pallet cover according to claim 1, wherein the cargo pallet cover is a multi-layer construction.

8. A cargo pallet cover according to claim 1, wherein the cargo pallet cover is fire resistant.

9. A cargo pallet cover according to claim 1, wherein the at least one drainage panel comprises at least two apertures in each layer of the is a multi-layer construction.

10. A cargo pallet cover according to claim 9, wherein a wick is provided between each of the layers in adjacent layers of the multi-layer construction.

11. A cargo pallet cover according to claim 1, wherein a wick is provided between each of the layers in adjacent layers of the multi-layer construction.

12. A cargo pallet cover according to claim 11, wherein the wick is fire resistant.

13. A cargo pallet cover according to claim 12, wherein the wick comprises a fire resistant textile material.

14. A cargo pallet cover according to claim 13, wherein the wick comprises fire resistant polyester.

15. A combination of a cargo pallet cover and a cargo pallet net, the cargo pallet cover having a main panel and a plurality of side panels extending therefrom, the main panel being adapted to overlie a load on a pallet in use and the side panels being adapted to hang down against the sides of the load, each side panel being attached to an adjacent side panel along adjacent edges to define a corner, the cargo pallet cover comprising at least one drainage panel to permit liquid to drain through the cargo pallet cover, wherein the pallet net comprises a plurality of reefing hooks and is attached to the cargo pallet cover in the region of the reefing hooks to define a fold in the cargo pallet cover, and wherein the at least one drainage panel is located in the fold.

\* \* \* \* \*